(12) United States Patent
Hansmann et al.

(10) Patent No.: US 11,117,126 B2
(45) Date of Patent: Sep. 14, 2021

(54) MEASURING DEVICE, REACTION CARRIER AND MEASURING METHOD

(71) Applicant: Dräger Safety AG & Co. KGaA, Lübeck (DE)

(72) Inventors: Hans-Ullrich Hansmann, Barnitz (DE); Philipp Rostalski, Lübeck (DE); Andreas Mohrmann, Krummesse (DE); Andreas Seeck, Lübeck (DE); Dirk Rahn-Marx, Reinfeld (DE); Rainer Polzius, Lübeck (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 571 days.

(21) Appl. No.: 14/784,663

(22) PCT Filed: Apr. 15, 2014

(86) PCT No.: PCT/EP2014/001008
§ 371 (c)(1),
(2) Date: Oct. 15, 2015

(87) PCT Pub. No.: WO2014/170015
PCT Pub. Date: Oct. 23, 2014

(65) Prior Publication Data
US 2016/0082431 A1 Mar. 24, 2016

(30) Foreign Application Priority Data

Apr. 16, 2013 (DE) ...................... 10 2013 006 544.5

(51) Int. Cl.
*B01L 3/00* (2006.01)
*G01N 21/78* (2006.01)
(Continued)

(52) U.S. Cl.
CPC ............... *B01L 3/502* (2013.01); *B01L 3/563* (2013.01); *G01N 21/05* (2013.01); *G01N 21/783* (2013.01);
(Continued)

(58) Field of Classification Search
CPC combination set(s) only.
See application file for complete search history.

(56) References Cited

U.S. PATENT DOCUMENTS 4,800,067 A   1/1989  Heckmann et al.
5,089,232 A * 2/1992  May ..................... G01N 21/783
                                                422/404
(Continued)

FOREIGN PATENT DOCUMENTS

CN          2118983 U    10/1992
CN        102072899 A     5/2011
(Continued)

*Primary Examiner* — Lore R Jarrett
(74) *Attorney, Agent, or Firm* — McGlew and Tuttle, P.C.

(57) ABSTRACT

A reaction carrier (14), a measuring device (12) and a measuring method for measuring a concentration of gaseous/aerosol components of a gas mixture uses reaction material (48) which reacts in an optically detectable manner with at least one component to be measured or with a reaction product of the component to be measured. The reaction carrier includes a flow channel (42) with sections (43) and extends between connecting elements (44). A gas treatment element (47), in each of the sections, changes chemical or physical properties of the gas mixture flowing therethrough or reacts, depending on the chemical or physical properties. The sections are separated from each other in a gas-tight manner by a separating element (49). A coupling element (45) opens the separating element and establishes a connection between the sections when the coupling element (Continued)

is activated. The measuring device includes an activation element (25) to activate the coupling element.

20 Claims, 10 Drawing Sheets

(51) Int. Cl.
*G01N 21/05* (2006.01)
*G01N 21/03* (2006.01)
*G01N 21/77* (2006.01)

(52) U.S. Cl.
CPC . *B01L 2200/026* (2013.01); *B01L 2200/0689* (2013.01); *B01L 2300/06* (2013.01); *B01L 2300/0832* (2013.01); *B01L 2300/105* (2013.01); *G01N 2021/036* (2013.01); *G01N 2021/0328* (2013.01); *G01N 2021/0357* (2013.01); *G01N 2021/7793* (2013.01)

(56) References Cited

U.S. PATENT DOCUMENTS

| | | | |
|---|---|---|---|
| 5,169,419 A | 12/1992 | Mori et al. | |
| 6,266,998 B1 * | 7/2001 | Hackenberg | G01N 21/7703 422/402 |
| 6,652,811 B1 * | 11/2003 | Pooch | G01N 21/783 422/504 |
| 7,332,348 B2 * | 2/2008 | Sandell | B01F 13/0064 436/180 |
| 7,473,397 B2 * | 1/2009 | Griffin | B01L 3/502738 137/825 |
| 8,668,874 B2 | 3/2014 | Tao et al. | |
| 2002/0045265 A1 * | 4/2002 | Bergh | B01J 4/00 436/37 |
| 2007/0031283 A1 * | 2/2007 | Davis | A61B 5/14546 422/400 |
| 2008/0138247 A1 * | 6/2008 | Inganas | G01N 35/00069 422/82.05 |

FOREIGN PATENT DOCUMENTS

| | | |
|---|---|---|
| CN | 102460140 A | 5/2012 |
| DE | 23 59 040 A1 | 5/1975 |
| DE | 27 18 218 A1 | 11/1978 |
| DE | 39 02 402 C1 | 6/1990 |
| DE | 44 15 866 C1 | 6/1995 |
| DE | 195 45 130 A1 | 6/1997 |
| DE | 10 2012 014504 A1 | 1/2014 |
| EP | 0 253 997 A1 | 1/1988 |
| JP | S57 114952 U | 7/1982 |
| JP | 2008 122193 A | 5/2008 |

* cited by examiner

MEASURING DEVICE, REACTION CARRIER AND MEASURING METHOD

CROSS REFERENCE TO RELATED APPLICATIONS

This application is a United States National Phase Application of International Application PCT/EP2014/001008 filed Apr. 15, 2014 and claims the benefit of priority under 35 U.S.C. § 119 of German Patent Application 10 2013 006 544.5 filed Apr. 16, 2013 the entire contents of which are incorporated herein by reference.

FIELD OF THE INVENTION

The present invention pertains to a measuring system and a measuring device for measuring a concentration of gaseous and/or aerosol components of a gas mixture for a reaction carrier, which has at least two flow channels, wherein at least one flow channel forms a reaction chamber with a reactant and the reactant reacts with at least one of the components to be measured in the gas mixture in an optically detectable manner. The present invention pertains, furthermore, to a reaction carrier for such a measuring device as well as to a measuring method for measuring a concentration of gaseous and/or aerosol components of a gas mixture.

BACKGROUND OF THE INVENTION

Gas detector tubes, which are filled with a reactant, which reacts with a chemical compound to be determined in an optically detectable reaction, are known from the state of the art. For example, a defined quantity of a gas mixture is pumped with a hand pump through the gas detector tube. A concentration of the chemical compound to be measured is subsequently determined by means of a discoloration of the reactant.

Moreover, so-called chip-based measuring systems are known, in which the reactant is arranged in reaction chambers on a reaction carrier, which can be inserted into a measuring device. The measuring device detects the reaction carrier and carries out a corresponding measuring method for measuring a concentration of the corresponding component of the gas mixture. For example, the reaction carrier has a plurality of reaction chambers, which may each be used for a measurement. A mechanical locking pin, which protrudes in unused reaction chambers, so that it can lock on the measuring device, is provided for each reaction chamber. The corresponding locking pin is pressed in during a measurement with a reaction chamber. Upon inserting the reaction carrier into the measuring device, the reaction carrier is always inserted into the measuring device until the first protruding locking pin mechanically locks in the measuring device and thus the first unused reaction chamber is always used for the respective measurement. After completion of the measurement, the reaction carrier is always completely ejected from the measuring device. An independent positioning of the reaction carrier in the measuring device in a desired relative position is not possible.

It is, furthermore, known to provide a plurality of different gas treatment elements in a reaction chamber, for example, a reactant for an optically detectable reaction and a desiccant, which extracts moisture from the gas mixture in the reaction chamber. The dimensions of the reaction chamber are, however, defined by the size of the reaction carrier, as a result of which only a limited quantity of different gas treatment elements can be arranged in a reaction chamber. Furthermore, only such gas treatment elements can be arranged in a common reaction chamber that do not react with one another in the reaction chamber even with longer storage of the reaction carrier. Furthermore, it is only possible with such a system to measure those components of a gas mixture that react with a reactant in an optically detectable manner.

SUMMARY OF THE INVENTION

An object of the present invention is to provide an improved measuring device as well as a corresponding reaction carrier and an improved measuring method, which makes possible an increased flexibility in the measuring method and an accurate concentration determination of a plurality of chemical compounds.

In one aspect, the present invention pertains to a reaction carrier for a measuring device for measuring a concentration of gaseous and/or aerosol components of a gas mixture by means of a reactant, which reacts with at least one component to be measured in the gas mixture or with a reaction product of the component to be measured in an optically detectable manner. The reaction carrier has at least one flow channel, which is split into at least two partial sections and which extends between two connection elements, and in the at least two partial sections is provided at least one gas treatment element each, which changes the chemical or physical properties of the gas mixture flowing through or reacts as a function of the chemical or physical properties. At least two partial sections of the at least one flow channel are separated from one another by a separating element in a gas-tight manner, and at least one coupling element is provided, which is designed (configured) to open the separating element upon activation of the coupling element and to establish a connection between the partial sections.

In this way, a plurality of different gas treatment elements can be arranged in the different partial sections of the flow channel. In particular, two or more gas treatment elements may also be arranged in separate partial sections, so that they are separated by the separating element in a gas-tight manner during the mounting of the reaction carrier and thus no chemical reaction can take place between components of the respective gas treatment elements. The splitting of the flow channel into a plurality of partial sections makes it possible, in addition, to provide an intermediate reaction in a first partial section, in which a component to be measured has a chemical reaction with a reactant (intermediate reactant) and the reaction product resulting thereby reacts with the reactant (detection reactant) in an optically detectable manner in a subsequent partial section. In this way, components of a gas mixture, for which no suitable optically detectable reaction with a suitable reactant is known, can also be measured.

According to an embodiment, the partial sections are formed by tubes, preferably glass capillary tubes, and the separating element is formed by at least one closed tube end, and the coupling element is designed to open the separating element by breaking off the tube end. This makes possible a simple design of the separating element, as well as a simple way to open the separating element.

For example, the at least one closed tube end is arranged in a cavity in the reaction carrier, and the coupling element has a sealing element, which closes the cavity in a gas-tight manner and which can be deformed upon activation of the coupling element in order to break off the at least one closed tube end arranged in the cavity. The design of the sealing element makes possible, on the one hand, a sealing of the cavity in which the at least one closed tube end is arranged and, on the other hand, a simple mechanism for opening the separating element by breaking off the tube end.

The reaction carrier preferably has an axial direction, which corresponds to a direction of movement of the reaction carrier in the measuring device, and the two connection elements are arranged in the same position in the axial direction. In this way, the connection elements are arranged analogously to the connection elements of the reaction carrier with one-piece flow channels, and the reaction carrier with a plurality of partial sections is designed as compatible with measuring devices, which are designed for reaction carriers with one-piece flow channels. In such a measuring device, the coupling elements, for example, may be activated manually by a user before the reaction carrier is inserted into the measuring device.

It is possible that at least one partial section of the flow channel crosses another partial section of the same or of a different flow channel. In this way, a flexible arrangement of the different partial sections of the flow channel on the reaction carrier is made possible. In particular, one of the crossing partial sections of the flow channel may be designed as a return section, in which no dedicated gas treatment element is provided. In order to make possible a low overall height of the reaction carrier, at least one of the crossing partial sections may be designed as a flat channel.

The gas treatment elements comprise, for example, at least two of the following gas treatment elements: Desiccants, reactants for producing a chemical intermediate product, chemical or physical filters, temperature- and/or moisture-sensitive substances, reactants for optically detectable reactions. Such gas treatment elements make it possible to optimize the optically detectable reaction by means of a corresponding pretreatment of the gas mixture, wherein, for example, the number of measurable components in the gas mixture and/or the accuracy of the concentration determination is increased.

The present invention pertains, furthermore, to a measuring device for measuring a concentration of gaseous and/or aerosol components of a gas mixture with a reaction carrier described in the present application. The measuring device comprises a gas inlet channel and a gas outlet channel with a gas port each for connection with the connection elements of the flow channel of the reaction carrier, and at least one activation element, which is designed to activate the at least one coupling element of the reaction carrier. In this way, the measuring device can activate the coupling elements of the reaction carrier and thus connect the partial sections of the flow channel to one another as well as establish a connection to the connection elements of the flow channel via the gas ports of the gas inlet channel and the gas outlet channel Preferably, an optical sensor is provided, which is designed to simultaneously detect at least two different, optically detectable reactions in at least two different partial sections. In this way, different components of the gas mixture can be measured independently of one another during a measurement, and/or additional parameters, for example, a temperature or moisture of the gas mixture of other chemical or physical properties of the gas mixture can be measured, which make possible an improvement of the accuracy of the concentration measurement of the component of the gas mixture. For example, the optical sensor is a digital camera, which has a correspondingly large recording field for the simultaneous detection of at least two gas treatment elements in at least two partial sections.

The recording field is preferably illuminated with broadband light, especially white light, and the optical sensor records a color image with a plurality of color channels. In order to make possible an optical analysis for different color changes in different types of optically detectable reactions, the color channels may be analyzed each with different weightings.

For example, the at least one activation element has a bridging channel, which establishes a connection of the partial sections of the reaction carrier upon activation of the coupling element. In this way, the connection of the partial sections of the flow channel of the reaction carrier can be established by the bridging channel of the activation element within the measuring device.

To make possible a compatibility of the measuring device for reaction carriers with a one-piece flow channel, the gas ports of the gas inlet channel and of the gas outlet channel are preferably arranged on opposite sides of the reaction carrier at a same axial position in the direction of movement of the reaction carrier in the measuring device.

It is possible that at least one gas port or at least one activation element is arranged movably in the measuring device along an axial direction, which corresponds to the direction of movement of the reaction carrier in the measuring device, and is designed to be positioned in an axially offset manner in relation to another gas port or another activation element. In this way, the measuring device can be adapted to reaction carriers with different arrangements of the partial sections of the flow channel and especially with a different number of partial sections.

The measuring device is preferably designed to read instructions stored on the reaction carrier or references to instructions stored in the measuring device for positioning the gas ports and/or activation elements and/or for carrying out the measuring method.

It is possible that an additional gas inlet channel and/or gas outlet channel with corresponding gas ports is provided. The various gas inlet channels and gas outlet channels may each be used in reactions carriers of different designs with different arrangement of the flow channels. For example, it is possible that two gas ports of a gas inlet channel or two gas ports of a gas outlet channel are each arranged on different sides of the reaction carrier in the measuring device. It is possible, as an alternative, that the corresponding gas ports are arranged on the same side of the reaction carrier in the measuring device. The plurality of gas inlet channels or the plurality of gas outlet channels may be connected via a valve to a common section of a gas inlet channel or gas outlet channel, wherein the valve selectively connects one of the plurality of gas inlet channels or plurality of gas outlet channels to the common section of the gas inlet channel or of the gas outlet channel.

The partial sections of the flow channel are preferably arranged at a right angle to the axial direction of the reaction carrier. This corresponds to the arrangement of the flow channels in reaction carriers with one-piece flow channel, as a result of which a uniform arrangement especially of partial sections with gas treatment elements with optically detectable reaction is made possible. This makes possible, on the one hand, a uniform method of production of the reaction carriers and, on the other hand, a uniform analysis of the image data of the optical sensor.

For example, the measuring device comprises a position sensor, which is designed to detect a relative position of reaction carriers and gas ports, as well as a reaction carrier delivery device for moving the reaction carrier in an axial direction in relation to the gas inlet channel and the gas outlet channel, wherein the reaction carrier delivery device is designed so as to position the reaction carrier in a first relative position for activating the at least one coupling element and in a second relative position for connecting the gas ports to the connection elements of the flow channel of the reaction carrier.

The present invention also pertains to a measuring method for measuring a concentration of gaseous and/or aerosol components of a gas mixture with a reaction carrier, which has a flow channel extending between two connection elements, wherein the flow channel is split into two partial sections, which are separated from one another by a separating element in a gas-tight manner and in which a gas treatment element each is provided, which changes the chemical or physical properties of the gas mixture flowing through or reacts as a function of the chemical or physical properties, and with a measuring device, which comprises a gas delivery device and gas ports. The measuring method comprises the method steps of establishing a connection between the partial sections by opening the separating element; of establishing a connection of the gas ports of the measuring device to the connection elements of the flow channel of the reaction carrier; of delivering a gas mixture to be measured through the flow channel of the reaction carrier; and of determining a concentration of the at least one component by means of an optically detectable reaction in at least one of the partial sections of the flow channel. This measuring method makes it possible to activate reactions carriers, in which gas treatment elements are arranged in partial sections, which are separated in a gas-tight manner, of a flow channel, by connecting the partial sections of the flow channel and to carry out a subsequent measurement of the concentration of a component in the gas mixture. In this way, different gas treatment elements may also be used, but cannot be stored for a long time in a common container, for example, because they react chemically with one another.

The present invention pertains, furthermore, to a measuring system with a reaction carrier described in the present application and/or with a measuring device described in the present application, which is suitable for carrying out the method described in the present application.

The embodiments described above may be combined with one another as desired and with the aspects described above in order to obtain the advantages according to the present invention. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
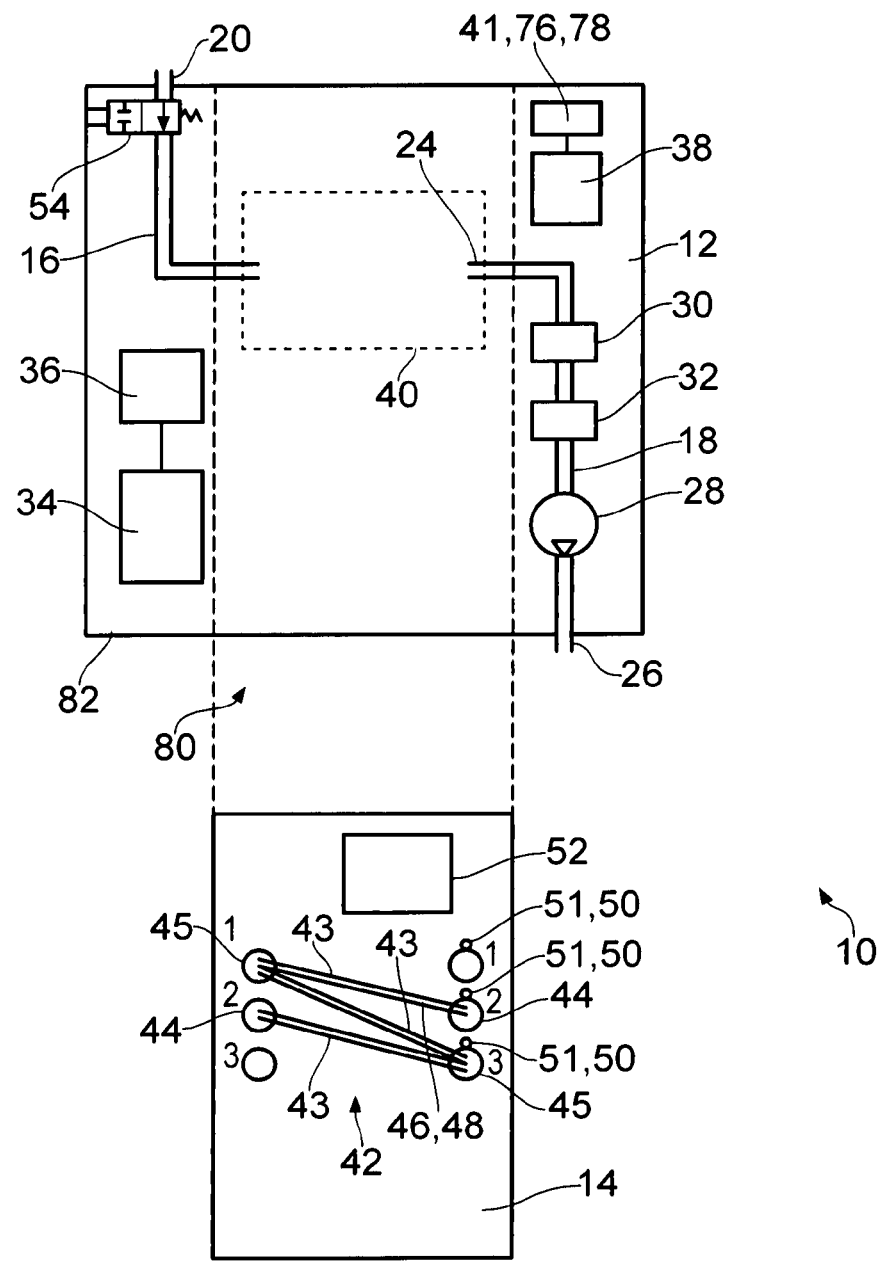
FIG. 1 is a schematic view of a first embodiment of a measuring system according to the present invention.

FIG. 1 illustrates a first embodiment of the present invention. A gas measuring system, which is hereinafter also called measuring system 10, is used for measuring and detecting the concentration of gaseous and/or aerosol components. An exchangeable reaction carrier 14, which is also called reaction carrier unit, is inserted manually by a user in a measuring device 12, which is also called gas measuring arrangement or otherwise gas measuring system. Here, the measuring system 10 or the measuring device 12 is a small, portable device, which can be used under mobile conditions and is provided with a battery as an energy supply.

A gas delivery device 28, which is embodied by a pump designed as a suction pump, is arranged at a housing of the measuring device 12. The housing forms, in addition, a mount, especially a sliding mount, for the displaceable reaction carrier 14. The reaction carrier can be moved within the housing of the measuring device by means of a reaction carrier delivery device 34 with a motor, e.g., an electric motor designed as a servomotor and a gear mechanism, especially a driving roll, which is rotatable by the servomotor, because there is a mechanical contact or a connection between the driving roll and the reaction carrier.

The measuring system 10 comprises the measuring device 12 and at least one reaction carrier 14. The measuring device 12 has a gas inlet channel 16 and a gas outlet channel 18. The gas inlet channel 16 extends from a gas mixture inflow opening 20 to a first gas port 22. The gas outlet channel 18 extends from a second gas port 24 to a gas mixture outflow opening 26. Furthermore, the gas delivery device 28, for example, a suction pump, is provided in the gas outlet channel for the delivery of a gas or gas mixture through the gas outlet channel 18.

The gas inlet channel 16 is made of glass, as a result of which a chemical reaction or a deposit of gas components on the wall of the gas inlet channel is prevented or reduced.

A flow sensor 30, which is designed as a mass flow sensor in the embodiment being shown, makes possible the measurement of a gas flowing through the gas outlet channel 18. Both devices, which measure the flow or the mass flow directly, as well as those which detect other measured values and determine the flow or mass flow by means of these measured values, may be used as flow or mass flow sensors.

Furthermore, a buffer 32, which makes possible a uniform gas flow through the gas outlet channel 18, is arranged in the gas outlet channel 18.

The measuring device 12 comprises, moreover, a reaction carrier delivery device 34, which makes possible a movement of the reaction carrier 14 in relation to the gas inlet channel 16 and to the gas outlet channel 18.

A position sensor 36 is used for detecting a relative position of the reaction carrier 14 and the gas ports 22, 24.

An optical sensor for detecting an optically detectable reaction is provided in the form of a digital camera 38 and makes possible a recording of the recording field 40 shown in FIG. 1 by the dotted rectangle. A central control unit 41 is provided, which can process the data detected by the optical sensor and controls the measuring method.

A valve 54 is arranged on the gas mixture inflow opening 20 upstream of the gas inlet channel 16. The valve makes possible, in its first position shown, a gas flow through the gas inlet channel 16 and prevents a gas flow through the gas inlet channel 16 in a second position. The valve 54 is designed as a 2/2-way valve in the embodiment shown.

The reaction carrier 14 shown in FIG. 1 has a flow channel 42, which extends between two connection elements 44. The flow channel is split into three partial sections 43. The reaction carrier 14 has an axial direction, which corresponds to the direction of movement of the reaction carrier 14 in the measuring device 12. Three numbered positions each, which are coded via a code 51, are provided on the left and right sides of the reaction carrier 14, so that they can be detected by the position sensor 36 of the measuring device 12. The left and right positions with the same number are located at the same height in the axial direction. The first partial section extends from the connection element 44 at number two on the left side to a coupling element 45 at number three on the right side of the reaction carrier 14. The second partial section extends from the coupling element 45 at number three on the right to a second coupling element 45 at number one on the left, and the third partial section 43 extends from the coupling element 45 at number one on the left to the connection element 44 at number two on the right.

In the embodiment being shown, the third partial section 43 of the flow channel 42 forms a reaction chamber 46, which is filled with a reactant 48. The reactant is a chemical compound, which reacts with a component to be measured in the gas mixture or with a reaction product of the component to be measured in an optically detectable manner. This is, for example, a colorimetric reaction.

A display pin 50, which forms a code 51, which is detected by the position sensor 36 and makes possible an independent positioning of the reaction carrier 14 in corresponding relative positions, is associated with each position in the axial direction. The reaction carrier 14 is positioned in each of the relative positions, such that the gas ports 22, 24 of the gas inlet channel and of the gas outlet channel 18 are in contact with the correspondingly numbered positions of the reaction carrier 14.

A different type of code 51, for example, an electric, electronic or magnetic code, may also be provided, which can be detected by a corresponding position sensor 36. However, at least additionally one optical code 51 is preferably provided, so that a user of the measuring system 10 can determine by looking at the reaction carrier 14 whether the reaction carrier 14 has an unused flow channel with an unused reaction chamber 46.

The reaction carrier 14 has, furthermore, an information field 52, on which information is stored. In the embodiment being shown, the information field 52 is designed as an optical information field, on which information is stored, which can be read by the digital camera 38. As an alternative, the information field 52 may be provided as an electronic memory for information and be designed, for example, as an RFID chip or SROM chip, which can be read and/or written to in a wireless manner or via electric contacts.

The recording field of the digital camera 38 is designed in the embodiment being shown, such that the reaction chambers 46, the display pins 50 and the information field 52 are each detected by the digital camera 38 in at least one relative position of the reaction carrier 14 in the measuring device 12. In this way, the digital camera 38 can be used, on the one hand, for detecting the optically detectable reaction of the reactant 48 in the reaction chamber 46 of the reaction carrier 14 and, on the other hand, for reading the information in the information field 52 and be used as a position sensor 36 for detecting the relative position of the reaction carrier and the gas ports 22, 24. It is, however, also possible that the position sensor 36 and a reading device for reading the information field 52 are designed as one or two separate devices.

Figure 2:
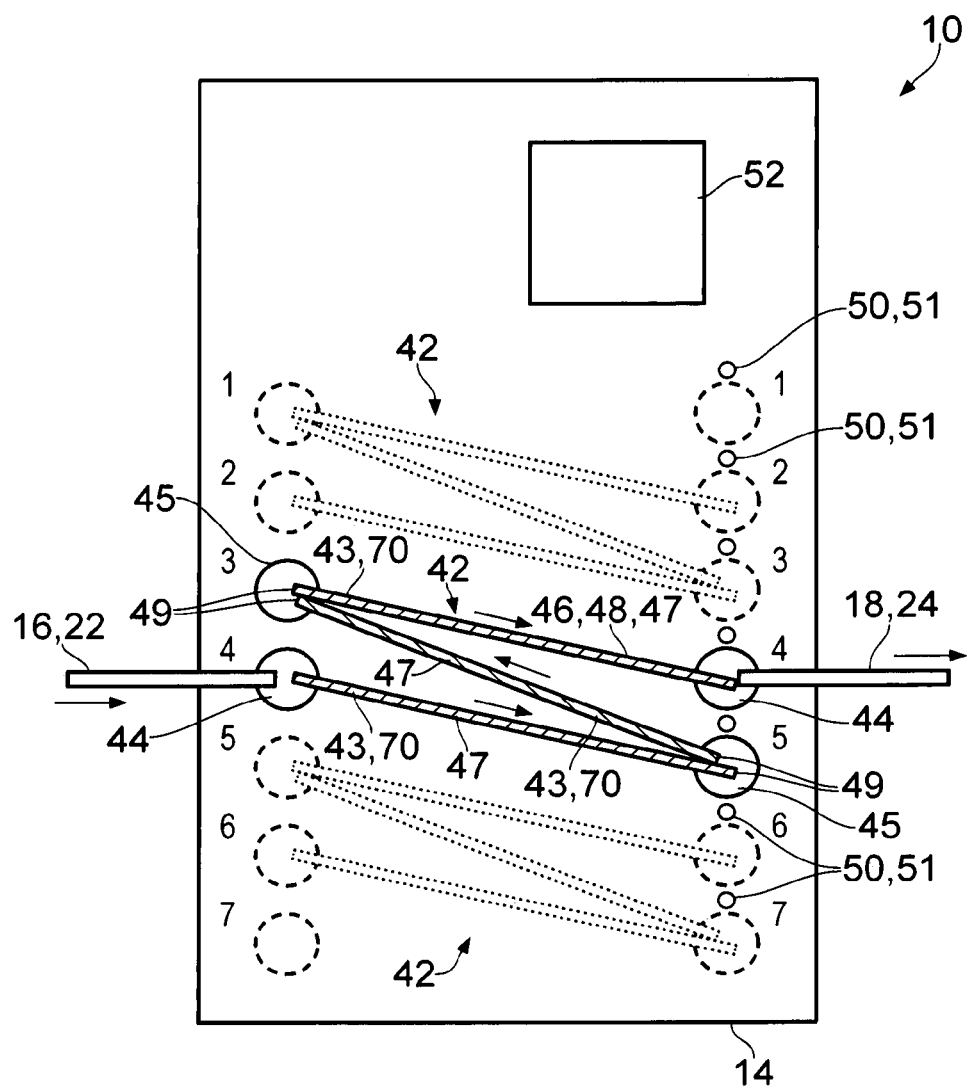
FIG. 2 is a schematic view of a second embodiment of a reaction carrier according to the present invention.

FIG. 2 shows a measuring system 10 with a measuring device 12, which is only shown schematically by the gas ports 22, 24 of the gas inlet channel and of the gas outlet channel and with a second embodiment of the reaction carrier 14. The reaction carrier 14 has three flow channels 42, which are each designed identically. For the sake of clarity, only the middle flow channel 42 is shown with solid lines, while the other two flow channels 42 are shown with dotted lines. Analogously to the reaction carrier 14 shown in FIG. 1, the reaction carrier 14 has seven numbered positions each on the left and on the right along its axial direction. The middle flow channel 42 extends from the connection element 44 at position four on the left via a first coupling element 45 at position five on the right and a second coupling element 45 at position three on the left to the second connection element 44 at position four on the right. Both connection elements 44 of the flow channel are thus arranged at the same position in the axial direction. The reaction carrier 14 can thus be used in measuring devices 12, whose gas ports 22, 24 are arranged at the same position in a direction of movement of the reaction carrier 14 within the measuring device 12.

A gas treatment element 47, which changes the chemical or physical properties of the gas mixture flowing through or reacts as a function of the chemical or physical properties, is provided in each of the three partial sections. For example, a desiccant or filtering agent is provided as a gas treatment element 47 in the first partial section 43. A reactant for producing a chemical intermediate product, which is called intermediate reactant below, wherein the component to be measured in the gas mixture reacts chemically with the intermediate reactant, and produces a reaction product. In the third partial section 43, a reactant 48 is provided as gas treatment element 47, which reacts with the reaction product of the component to be measured in an optically detectable manner.

Three partial sections 43 of the flow channel 42 are each separated in a gas-tight manner from one another by separating elements 49. In the embodiment being shown, the partial sections 43 of the flow channel 42 are each formed by tubes 70, especially glass capillary tubes, which are closed at at least one, and preferably at both ends. The separating elements 49 are thus formed by the closed tube ends of the tubes 70 formed the partial sections 43 of the flow channel 42.

The coupling elements 45 are designed to open the associated separating element 49 upon activation of the respective coupling element 45 and to establish a connection between the partial sections 43 of the flow channel 42. In the embodiment being shown, the coupling elements 45 are designed to open the associated separating element 49 by breaking off the tube ends.

The direction of flow of the gas mixture through the gas inlet channel 16, the gas outlet channel 18 and the flow channel 42 of the reaction carrier 14 is in each case shown by arrows in the figures.

Figure 3:
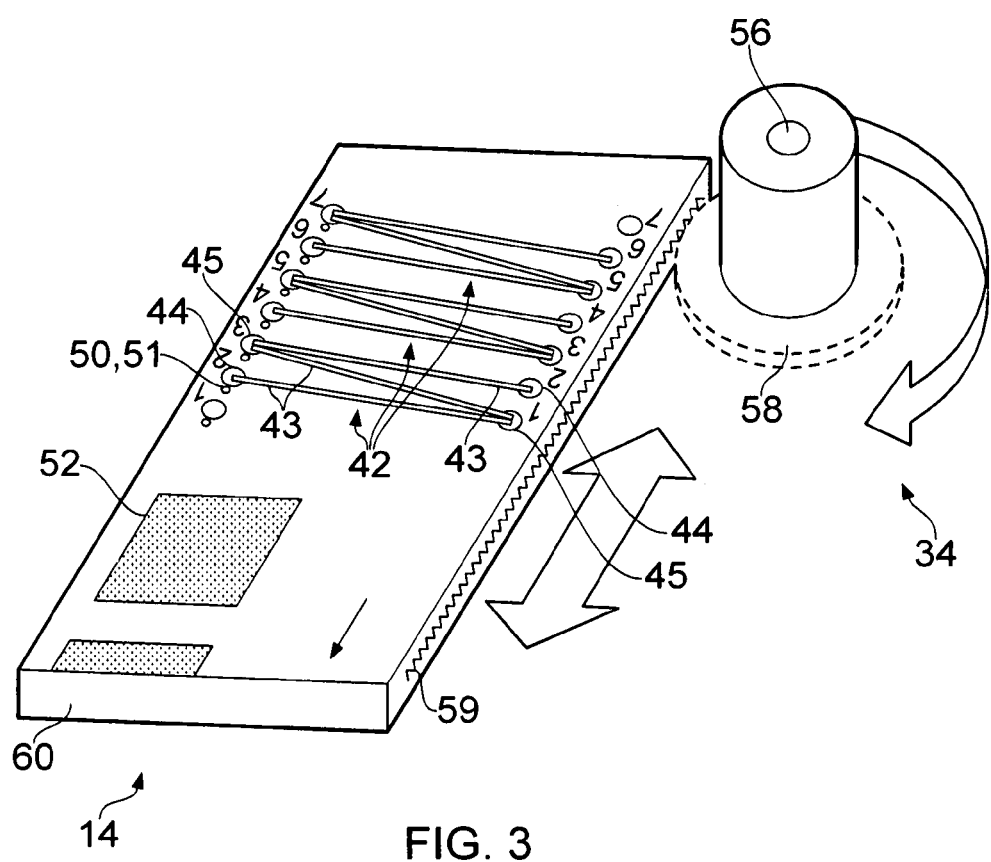
FIG. 3 is a detail view of the reaction carrier from FIG. 2 and of a reaction carrier delivery device.

FIG. 3 shows a perspective detail view of the reaction carrier according to FIG. 2 and the reaction carrier delivery device 34 of the measuring device 12. The reaction carrier delivery device 34 comprises a servomotor 56 and a gear mechanism 58. The gear mechanism 58 comprises, for example, a gear wheel, which meshes with corresponding teeth 59 at the reaction carrier 14. The teeth 59 are formed on a housing 60 of the reaction carrier 14.

The reaction carrier delivery device 34 makes possible a relative movement of the reaction carrier 14 in two opposite directions, as a result of which a desired positioning of the reaction carrier 14 in the measuring device 12 is made possible. Preferably, the reaction carrier 14 is moved into and removed from the measuring device 12 through a single feed opening in a housing of the measuring device 12.

The reaction carrier 14 is positioned in the measuring device 12 via a code 51 on the reaction carrier 14, which can be detected by a position sensor 36 of the measuring device 12, wherein the reaction carrier delivery device 34 can be correspondingly controlled or regulated to position the reaction carrier 14 into the various relative positions independently. In this way, the reaction carrier 14 can be positioned after insertion into the measuring device 12, so that the activation elements 25 of the measuring device 12 can activate the coupling elements 45. After activation of the coupling elements 45 by the activation elements 25 of the measuring device 12 and thus the connection between the partial sections 43 of the flow channel 42, the reaction carrier 14 is positioned so that the gas ports 22, 24 of the measuring device 12 can be connected to the connection elements 44 of the flow channel 42 of the reaction carrier 14. After establishing the connection of the gas ports 22, 24 and the connection elements 44 of the flow channel 42, a gas mixture to be measured can be delivered by the gas delivery device 28 through the flow channel 42 of the reaction carrier 14, and a concentration of the component to be measured in the gas mixture can be determined on the basis of the course of the optically detectable reaction in the reaction chamber 46 of the third partial section 43 of the flow channel 42.

The gas ports 22 and 24 of the gas inlet channel 16 and of the gas outlet channel 18 as well as the corresponding connection elements 44 of the reaction carrier 14 are described below on the basis of FIGS. 4 and 5. The connection elements 44 of the reaction carrier 14 comprise a sealing device 62 with a first seal 64 and a second seal 66, which prevent a penetration of gas into the flow channel 42.

The flow channel 42 is formed by a tube 70, by a glass tube in the embodiment being shown, which is embedded into the housing 60 of the reaction carrier 14. The glass tube ends in a recess 72 in the housing 60. The recess 72 in the housing 60 is closed by the first seal 64. The first seal 64 is formed, for example, by a small glass plate or a film. The second seal 66 is formed by a closed end of the glass tube. The closed end of the glass tube of the flow channel 42 extends freely into the recess 72 in the housing 60.

Figure 6:
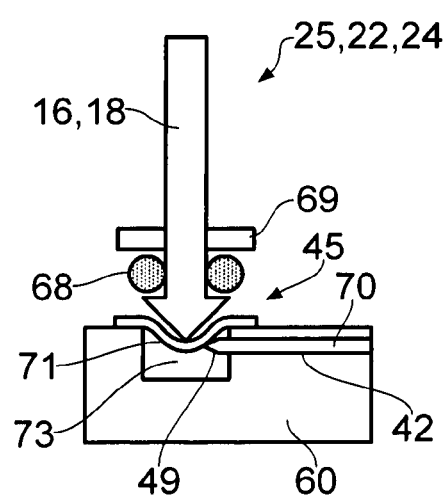
FIG. 6 is a detail view of an embodiment of the coupling element of the reaction carrier and of the activation element of the measuring device in a first position.

The gas ports 22, 24 are formed at the end of the gas inlet channel 16 or at the beginning of the gas outlet channel 18. The gas port 22, 24 comprises a seal 68 and a gas connection piece. FIG. 6 shows the gas port 22, 24 in a starting position, in which the gas port 22, 24 is separated from the connection element 44 of the reaction carrier 14. The gas port 22, 24 may be lowered in the direction of the reaction carrier 14 or, as an alternative, the reaction carrier 14 may be moved in the direction of the gas port. During the lowering of the gas port 22, 24, the lower end of the gas connection piece strikes the first seal 64 and pierces same. The seal 68 of the gas port 22, 24 then comes into contact with the housing 60 of the reaction carrier 24 and forms a gas-tight seal of the recesses 72 of the connection element 44.

Figure 7:
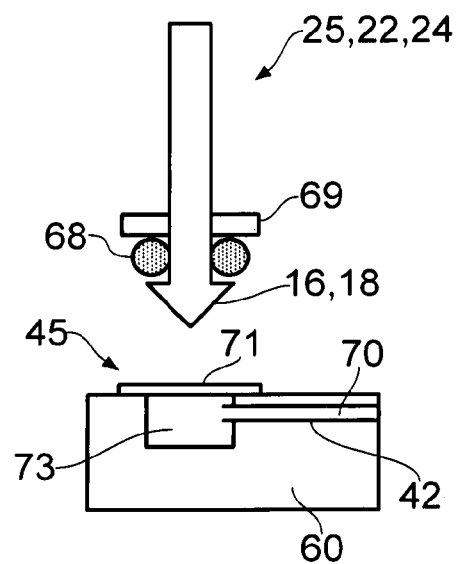
FIG. 7 is a detail view of an embodiment of the coupling element of the reaction carrier and of the activation element of the measuring device in a second position.

Upon further lowering of the gas port 22, 24, the gas connection piece breaks off the closed end of the glass tube 70 of the flow channel 42 and in this way opens the second seal 66 of the connection element 44. FIG. 7 shows the end position of the gas port 22, 24, in which the connection between the gas port 22, 24 and the connection element 44 of the flow channel 42 is established.

As an alternative, it is possible that the first seal 64 is designed, for example, as flexible, so that a piercing of the first seal 64 happens only if the seal 68 of the gas port 22, 24 is already in sealing contact with the housing 60 of the reaction carrier 14. It is also possible that the seal is designed so that it comes into contact with the housing 60 of the reaction carrier 14 first for sealing the recess 72 during the lowering of the gas port 22, 24. Furthermore, it is also possible that only one of the seals 64 or 66, of the sealing device 52, are provided at the connection elements 44 of the reaction carrier 14.

An activation element 25 of the measuring device 12 as well as a coupling element 45 and a corresponding separating element 49 of the reaction carrier 14 are described below on the basis of FIGS. 6 and 7. The activation element 25 of the measuring device 12 is formed by one of the gas ports 22, 24 of the measuring device 12 in the embodiment being shown. As an alternative, it is also possible that at least one activation element 25 is designed as a separate, independent component of the measuring device 12, which fulfills the same function described below.

Figure 4:
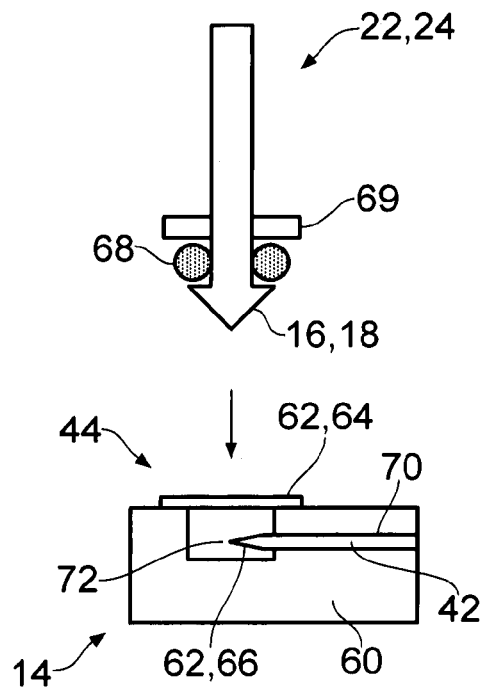
FIG. 4 is a detail view of an embodiment of the gas port and of the connection element of the reaction carrier in a first position.
Figure 5:
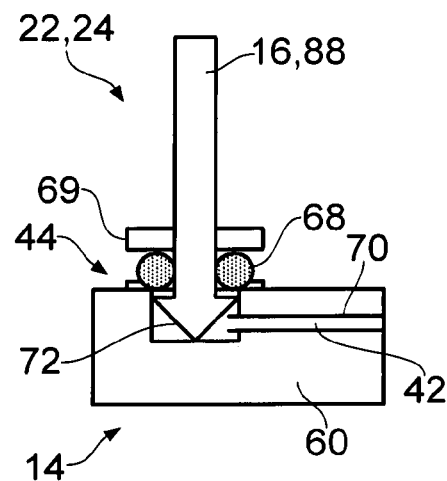
FIG. 5 is a detail view of an embodiment of the gas port and of the connection element of the reaction carrier in a second position.

The coupling element 45 comprises a cavity 73 in the housing 60 of the reaction carrier 14, which is essentially designed analogously to the recess 72 of the connection element 44 shown in FIG. 4. The separating element 49 is a closed tube end of a glass capillary tube, which forms a partial section 43 of the flow channel 42, and extends freely into the cavity 73 of the coupling element 45.

The coupling element 45 comprises, furthermore, a sealing element 71, which closes the cavity in a gas-tight manner and which can be deformed upon activation of the coupling element 45 in order to break off the at least one closed tube end arranged in the cavity 73. The sealing element 71 of the coupling element 45 is, in contrast to the first seal 64 of the sealing device 62 of the connection element 44, designed so that it is not pierced by the gas connection piece of the gas port 22, 24, and thus the cavity 73 is also closed in a gas-tight manner by the sealing element 71 after the activation of the coupling element 45.

FIG. 6 shows the gas port 22, 24 acting as an activation element 25 in a partially lowered position, wherein the sealing element 71 is already partially deformed. Upon a further lowering of the gas port 22, 24, the closed tube end of the tube 70 breaks off, as a result of which the separating element 49 is opened.

As can be seen in the view in FIG. 2, two tubes 70 end in a cavity 73 of a coupling element 45. After breaking off of the two tube ends, which form the separating element 49 of the two corresponding partial sections 43 of the flow channel 42, the two partial sections 43 of the flow channel 42 are connected to one another via the cavity 73 of the coupling element 45. FIG. 7 shows the coupling element 45 after the gas port 22, 24, acting as activating element 24, was already raised. The sealing element 71 is thereby returned into its original starting position and closes, moreover, the cavity 73 in the housing 60 of the reaction carrier 14.

The separating element 49 and the coupling element 45 may also be designed in a different way. For example, the separating and coupling element may be designed as a common separating and coupling element, which separates the partial sections 43 of the flow channel 42 in a valve-like manner in a starting position and connects the partial sections 43 of the flow channel 42 to one another in an activation position. Such a common separating and coupling element can be arranged in the housing 60 of the reaction carrier, for example, by means of a recess and be moved into the activation position by an activation element of a measuring device by rotating or lowering the starting position.

Figure 8:
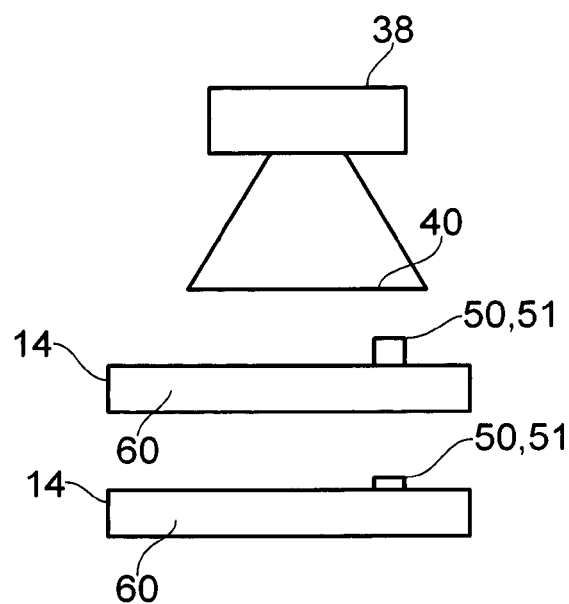
FIG. 8 is a side view of the digital camera, of the reaction carrier with a display pin in a first position and the reaction carrier with the display pin in a second position.

The code 51 of the reaction carrier 14 for the independent positioning of the reaction carrier 14 in a plurality of different relative positions in the measuring device 12 is described below on the basis of FIGS. 8 and 9.

The position sensor 36 for detecting the relative position of the reaction carrier 14 and the gas ports 22, 24 is embodied by a digital camera 38 in the embodiment being shown together with the optical sensor for detecting the optically detectable reaction of the reactant 48. In this way, no separate component is needed for the function of the position sensor. However, it is also possible that a non-optical position sensor, for example, an electric or magnetic position sensor, is provided, which can detect a corresponding code 51 of the reaction carrier 14.

The detection of the position of the reaction carrier 14 likewise takes place in a simple manner by means of the digital camera, because the analysis device has a corresponding optical software, by means of which the position of the reaction carrier 14 can be determined based on the data detected by the digital camera. The gas port 22, 24 is subsequently moved downwards, so that consequently the seal can be pierced by the gas connection piece and the gas mixture can be drawn in through the outflow opening. The display pin 50 is additionally moved now by an expansion or display pin-moving element of the support ring (not shown) from a first position according to the upper reaction carrier 14 in FIG. 8 into a second position according to the lower reaction carrier 14 in FIG. 8. In the first position of the display pin 50, this pin projects farther out of the housing 60 of the reaction carrier than in the second position. The position of the display pin 50 may also be detected with the digital camera, and the display pin has a different color, for example, orange, than the rest of the reaction carrier 14, for example, the housing 60 is colored at least partially blue.

Figure 9:
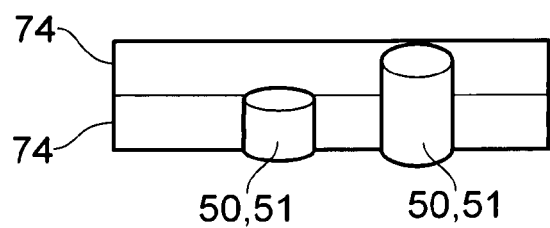
FIG. 9 is a perspective view of the display pin in the first position and display pin in a second position.

The digital camera 38 has two separate ROIs (regions of interest), i.e., partial areas 74 of the recording field 40 of the digital camera 38, so that the color orange appears in the upper partial area 74 in FIG. 9 in the first position and no color or a substantially smaller quantity of the color of the display pin 50 appears on the upper partial area 74 in the second position. Consequently, it is possible to detect by the optical analysis software of the analysis device of the central control unit 41 whether a display pin 50 is located in the first or second position. Based on this detection of the first or second position of the display pin 50, the reaction carrier delivery unit 34 is moved, furthermore, independently and automatically by the servomotor 56 into such a position that the first, up to now unused glass tube, through which no gas has been passed up to now, lies with the outflow opening above the gas connection piece of the gas port 22, 24, and it is only thereafter that the gas port 22, 24, especially the suction pump and the gas connection piece, are moved downwards corresponding to FIGS. 4 and 5.

In the embodiment being shown, the display pin 50 is always arranged adjacent to the connection elements 44 and coupling elements 45 at the edge of the reaction carrier 14. The display pin 50 thus lies in the edge area of the recording field 40 of the digital camera 38 and is thus detected by the digital camera 38 obliquely at an angle, as a result of which the height of the display pin can be detected.

In this way, the digital camera 38 or the optical analysis software can detect a position of a display pin 50, on the one hand, and thus approach any desired relative position of the reaction carrier 14 in the measuring device 12 via the reaction carrier delivery device 34. On the other hand, the information on whether or not the corresponding flow channel 42 has already been used can be read based on the height of the display pin 50. The code 51 codes, in addition, whether all coupling elements 45 of the flow channel 42 were activated and thus all partial sections 43 are connected to one another. For this, for example, a display pin 50 may also be provided at each connection element 44 and coupling element 45.

Instead of an optical code 51, for example, an electric or magnetic code 51 may also be provided, which can be embodied, for example, by means of an electrically conductive field on the surface of the ho using 60.

Figure 10:
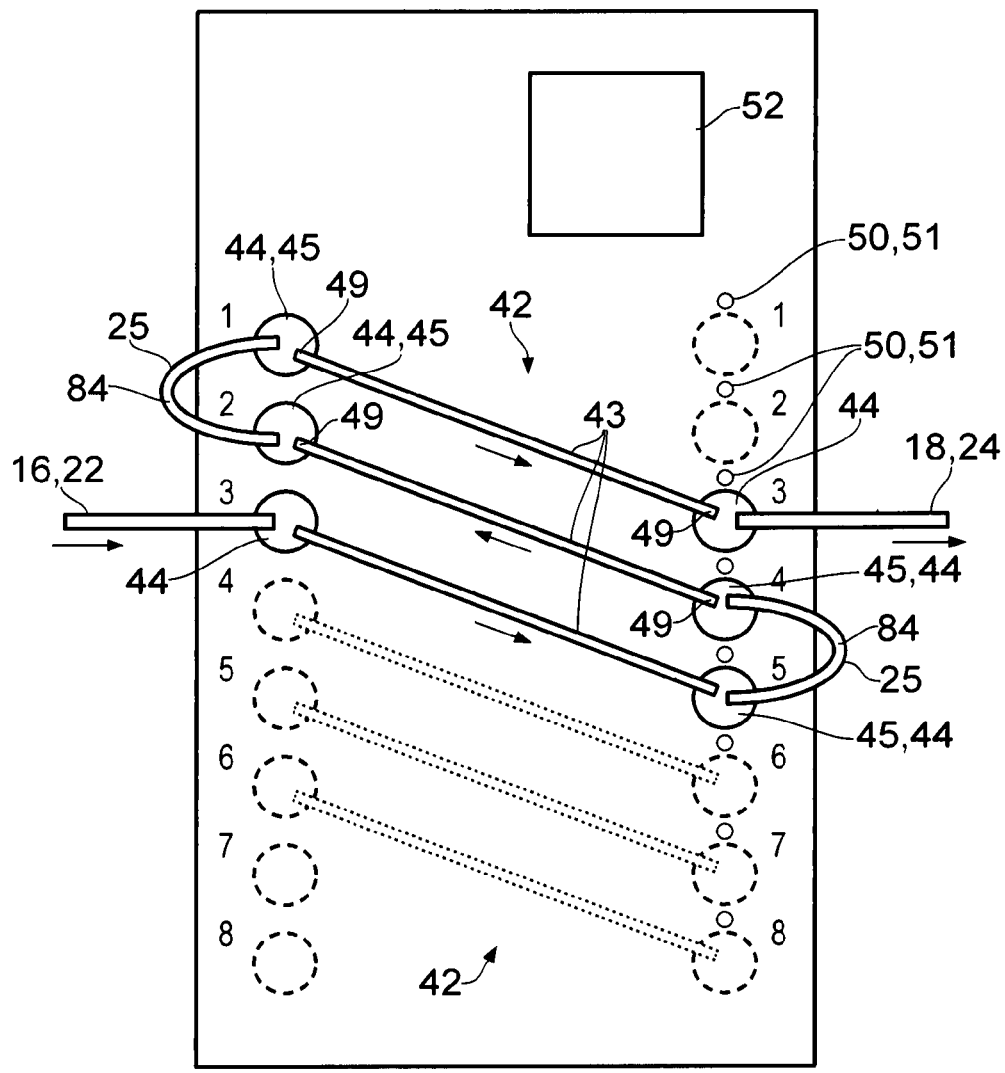
FIG. 10 is a schematic view of a measuring system with a reaction carrier according to a third embodiment.

FIG. 10 shows a schematic view of a second embodiment of a measuring system 10. The reaction carrier 14 has two flow channels 42 with three partial sections 43 each, wherein the upper flow channel 42 is shown with solid lines and the second, lower flow channel 42 is shown with dotted lines. The three partial sections 43 of the flow channel 42 extend each in the axial direction diagonally offset between two connection/coupling elements 44, 45, wherein the connection element 44 at position three on the left and the connection element 44 at position three on the right in each case form the connection elements 44 for the gas ports 22, 24 of the gas inlet channel 16 and of the gas outlet channel 18 of the measuring device 12. The connection/coupling elements 44, 45 of positions five on the right, four on the right, two on the left and one on the left are each associated with a separating element 49, which separate the partial sections 43 of the flow channel 42 from one another in a gas-tight manner.

The measuring device 12 comprises two activation elements 25, which are designed as separate components of the measuring device 12 and which have each a bridging channel 84. The ends of the bridging channel 84 may be lowered to establish a connection of the bridging channel 84 to the associated connection/coupling elements 44, 45 of the partial sections 43 of the flow channel 42 to be connected.

Figure 11:
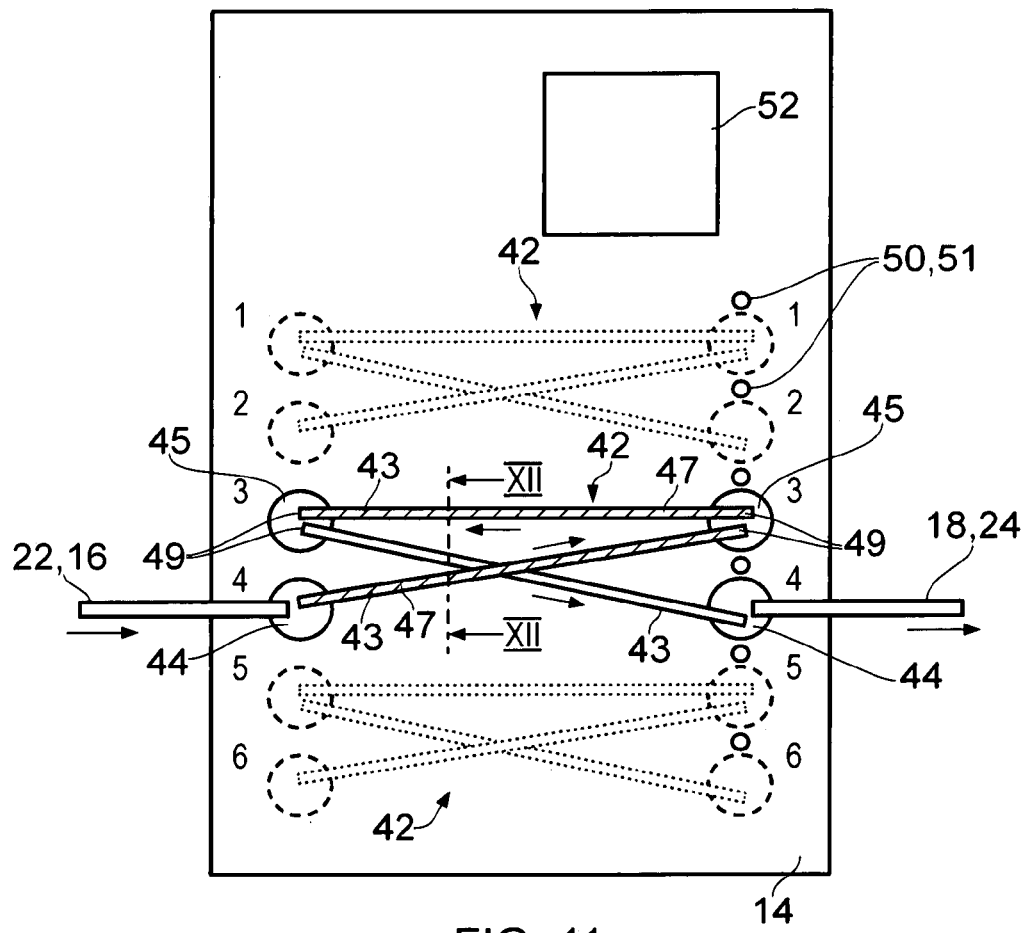
FIG. 11 is a schematic view of a measuring system with a reaction carrier according to a fourth embodiment.
Figure 12:
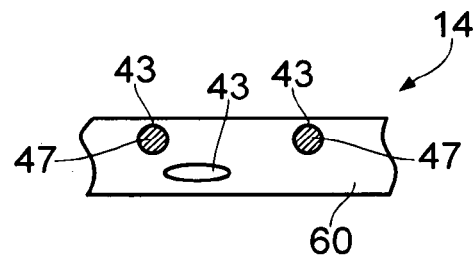
FIG. 12 is a sectional view of the reaction carrier from FIG. 11.

A fourth embodiment of a reaction carrier 14 is shown in FIGS. 11 and 12. The reaction carrier 14 has three flow channels 42, each of which comprises three partial sections 43. The middle channel of the flow channels 42 is shown with solid lines, while the upper and lower flow channels 42 are shown in dotted lines. The middle flow channel 42 extends from a connection element 44 at position four on the left over the first partial section 43 to a coupling element 45 at position three on the right, over a second partial section 43 to a second coupling element 45 at position three on the left and over a third partial section 43 to a second connection element 44 at position four on the right. The first partial section 43 and the third partial section 43 cross each other in the housing 60 of the reaction carrier 14.

As is shown in the sectional view of the reaction carrier 14 in FIG. 12, the two partial sections 43 cross each other at different heights in the housing 60 of the reaction carrier 14.

In the embodiment being shown, the third partial section 43 is only provided as a return section, in which no dedicated gas treatment element 47 is arranged. Thus, the cross section and the section routing of the partial section 43 can be selected in a flexible manner, as a result of which, for example, as in the embodiment being shown in FIG. 12, the returning partial section 43 is designed as a flat channel, as a result of which the reaction carrier 14 can be embodied with a low overall height.

The connection elements 44 and the coupling elements 45 are designed analogously to the design shown in FIG. 2.

In the embodiment being shown in FIG. 11, opposite coupling elements 45 or connection elements 44 each of the same flow channel are arranged at the same positions in the axial direction each on the right and on the left. In this way, both the gas ports 22, 24 and the activation elements 25 on both sides of the reaction carrier can be lowered at the same time, so that a simple control of the gas ports 22, 24 and of the activation elements 25 is possible.

Figure 13:
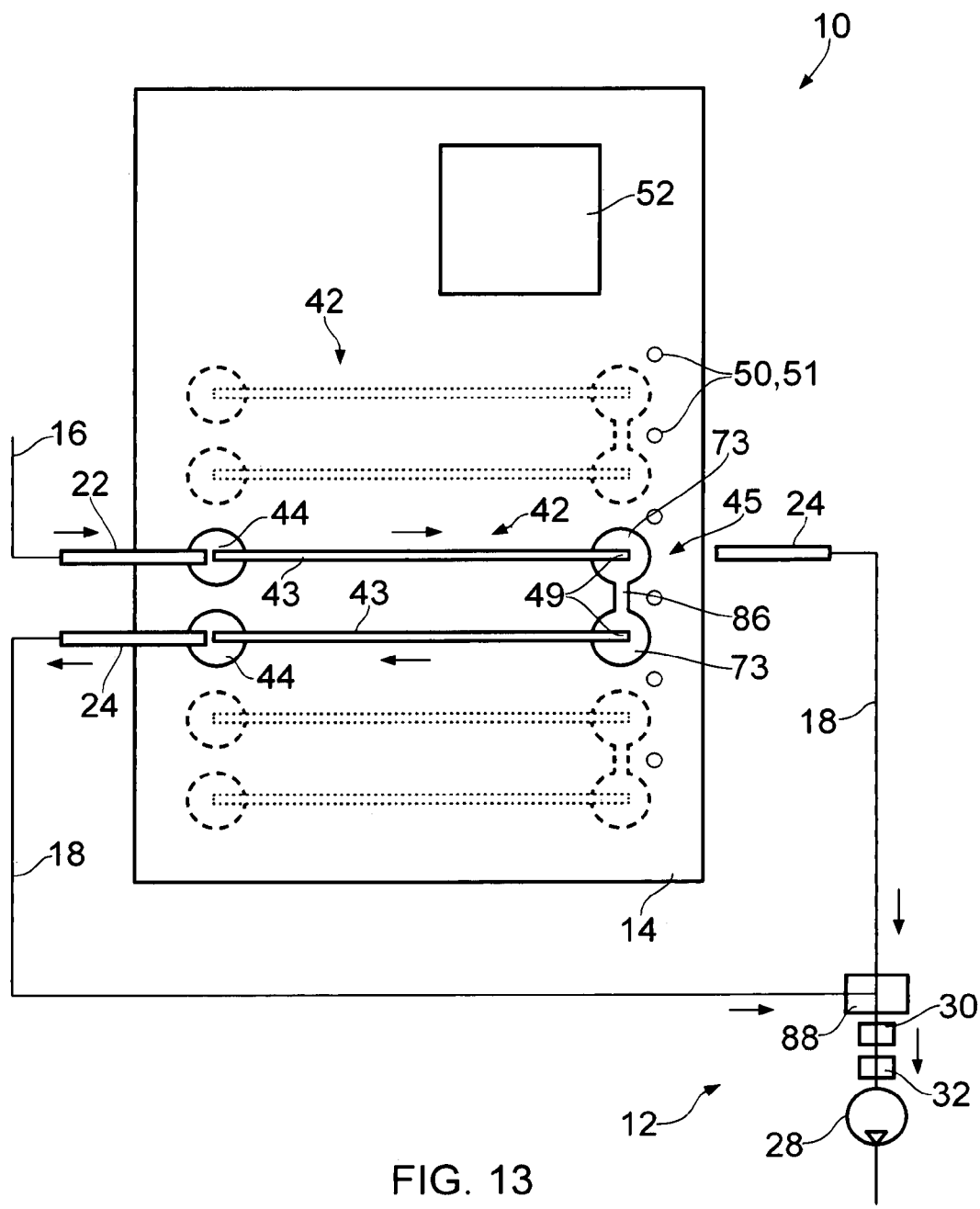
FIG. 13 is a schematic view of a measuring system with a reaction carrier according to a fifth embodiment and with a measuring device according to a second embodiment.

FIG. 13 shows a measuring system 10 with a fifth embodiment of a reaction carrier 14 and a schematically shown measuring device 12 according to a third embodiment. The reaction carrier 14 has three flow channels 42, of which the middle flow channel is shown with solid lines and the upper and lower flow channels 42 are each shown with dotted lines. The middle flow channel 42 comprises two partial sections 43, which are each oriented at right angles to the axial direction of the reaction carrier 14. The flow channel 42 extends from a connection element 44 at position three on the left over the first partial section 43 to a coupling element 45, which extends over positions three on the right and four on the right. The second partial section 43 of the flow channel 42 extends from position four on the right to a second connection element 44 at position four on the left.

The coupling element 45 is through two cavities 73, which are each designed analogously to those of the coupling element 45 shown in FIGS. 6 and 7, wherein the cavities are connected to one another via an intermediate channel 86.

The schematically shown measuring device 12 comprises a gas inlet channel 16 with a gas port 22 and two gas outlet channels 18 each with corresponding gas ports 24. The gas port 24 of the first gas outlet channel 18 is arranged at the same position in the direction of movement of the reaction carrier 14 in the measuring device 12 opposite the gas port 22 of the gas inlet channel 16. The gas port 24 of the second gas outlet channel 18 is arranged on the same side of the reaction carrier 14 as the gas port 22 of the gas inlet channel 16 and is arranged offset by one position in the direction of movement of the reaction carrier 14. Such a measuring device 12 may connect reaction carriers 14 of different designs in a flexible manner with the corresponding gas ports 24 of the two gas outlet channels 18.

In the embodiment being shown, a common section of a gas outlet channel 18 is provided, in which the flow sensor 30, the buffer 32 and the gas delivery device 28 are arranged. A valve 88 is provided, which selectively connects the first or second gas outlet channel 18 to the common section of the gas outlet channel 18. It is possible that the gas port 24, which is not used for delivering gas, is used as an activation element 25 for activating the coupling element 45.

Figure 14:
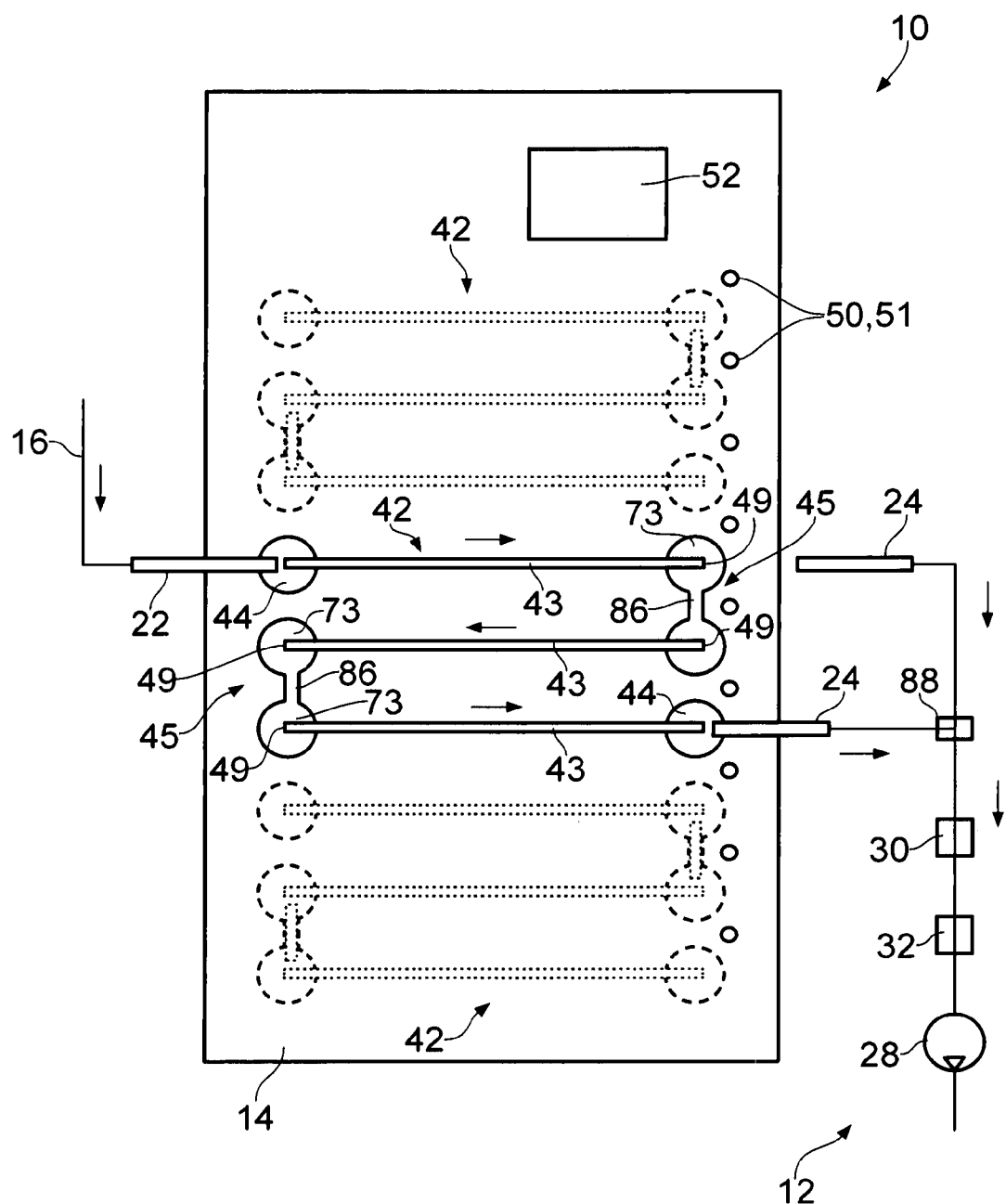
FIG. 14 is a schematic view of a measuring system with a reaction carrier according to a sixth embodiment and with a measuring device according to a third embodiment.

FIG. 14 shows another embodiment of a measuring system 10, which is essentially designed analogously to the previous measuring system. The reaction carrier 14 differs from the previous reaction carrier 14 by an additional partial section 43 being provided, which extends from a coupling element 45 at positions four on the left and five on the left to a connection element 44 at position five on the right. The measuring device 12 differs from the measuring device 12 of the previous embodiment by the two gas ports 24 of the two gas outlet channels 18 both being arranged on the right side of the reaction carrier 14 and thus both opposite the gas port 22 of the gas inlet channel 16. In the embodiment being shown, the two gas ports 24 of the two gas outlet channels 18 are offset by two positions in the direction of movement of the reaction carrier 14. It is, however, also possible that another offset in the axial direction is provided, or that at least one of the gas ports 24 in the measuring device 12 is arranged movably in the axial direction and thus the offset in the axial direction can be changed and can be adapted to the reaction carried used in each case.

Figure 15:
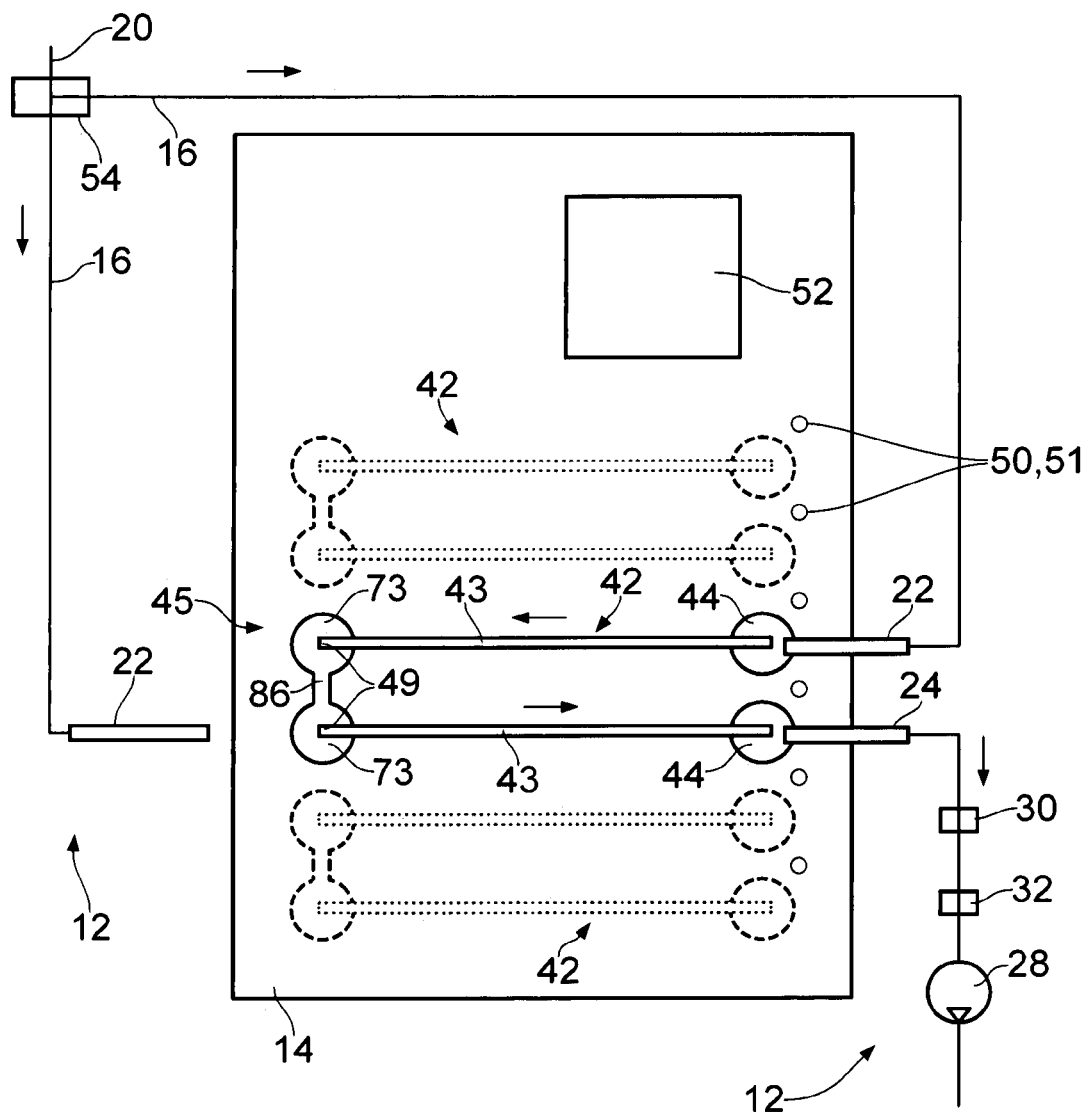
FIG. 15 is a schematic view of a measuring system with a reaction carrier according to a seventh embodiment and with a measuring device according to a fourth embodiment.

FIG. 15 shows another embodiment of the measuring system 10. The reaction carrier 14 is designed analogously to the reaction carrier 14 from FIG. 13 and differs in that the connection elements 14 and the coupling element 45 and thus the direction of flow through the partial sections 43 are arranged in a mirror-inverted manner.

The measuring device 12 has two gas inlet channels each with a gas port 22. A first gas port 22 of a first gas inlet channel 16 lies on the left side of the reaction carrier 14 at the same axial position opposite the gas port 24 of the gas outlet channel 16. The second gas port 22 of the second gas inlet channel 16 lies on the right side of the reaction carrier and thus on the same side of the reaction carrier 14 as the gas port 24 of the gas outlet channel 18.

It is also possible that the second gas port 22 of the second gas inlet channel 16 is arranged movably in the axial direction, as a result of which the gas port 22 can occupy different axial offset sections opposite the gas port 24 of the gas outlet channel 18, and/or is arranged on the same side of the reaction carrier 14 as the first gas port 22 of the first gas inlet channel 16 axially offset to the first gas port 22.

It is also possible that the two gas inlet channels 16 have a common section, which can be connected via a valve selectively to the first or second gas inlet channel 16, wherein the valve in this embodiment is designed combined with the valve 54 at the gas mixture inflow opening 20.

A measuring method is described below with reference to the measuring device shown in FIG. 1 and the reaction carrier 14 shown in FIG. 2.

The reaction carrier 14 is inserted into the insertion opening 80 in a housing 82 of the measuring device 12. The reaction carrier 14 is inserted, for example, manually into the insertion opening, detected by the reaction carrier delivery device 34 and transported forwards into the direction of insertion.

During the transporting of the reaction carrier 14, the information field 52 of the reaction carrier 14 passes through the recording field 40 of the digital camera 38, wherein the information on the information field 52 is detected by the digital camera 38 and can be analyzed in an analysis device of the central control unit 41. It is also possible that the reaction carrier is positioned in a reading position, in which a reading of the information field 52 is made possible. In the embodiment shown in FIG. 13, the information on the information field 52 is stored optically and can thus be read by the digital camera 38 in a simple manner. It is also possible, as an alternative, that an electronic information field 52 is provided, which is designed, for example, as an active or passive RFID chip or SRAM chip and can be read in a wireless manner or via electric contacts. The electric contacts are preferably established via data lines to the inflow and outflow openings of the flow channels 42 and gas connection pieces consisting of a current-conducting material, so that a current and data connection is established between the SRAM chip and a corresponding reading device, while the gas connection pieces are located in the inflow and outflow openings.

The information of the reaction carrier 14, which is contained on the information field 52, especially relating to the component to be measured in the gas mixture and a corresponding concentration range, is read in a first method step. The read information contains instructions for the measuring method to be carried out or contains a reference to instructions, which are stored on the measuring device 12, especially in the central control unit 41.

Three independent flow channels 42, each of which makes possible a measurement, are provided on the reaction carrier 14. A measurement with the middle flow channel 42, shown in solids lines, is described below. This is, for example, the case when a measurement was already carried out with the flow channel foremost in the direction of movement and the foremost flow channel thus does not have an unused reaction chamber. Used and unused flow channels 42 are characterized by the code 51, which is read by the digital camera.

In a next method step, the reaction carrier 14 is positioned by the reaction carrier delivery device 34, such that the gas port 22 of the gas inlet channel 16 is arranged at position three of the reaction carrier 14, and the gas port 22 is lowered in order to activate the coupling element 45, as the activation element 25, of the reaction carrier. Subsequently, the reaction carrier is positioned, such that the gas port 24 of the gas outlet channel 18 is arranged at position five of the reaction carrier 14, and the gas port 24 is lowered in order to activate the coupling element 45, as the activation element 25, of the reaction carrier 14.

In a further method step, the reaction carrier is positioned such that the gas ports 22, 24 are arranged at position four of the reaction carrier 14 (see FIG. 2). The gas ports 22, 24 are each connected to the connection elements 44 of the flow channel 42 by means of lowering.

After the connection is established between the gas ports 22, 24 by the flow channel 42, the gas delivery device 28 delivers a gas mixture to be measured through the outlet channel 18, the second flow channel 42 and the gas inlet channel 16. The gas mixture flows through the three partial sections 43 of the flow channel, wherein the component to be measured in the gas mixture is reacted with the intermediate reactant in the gas treatment element 47 of the second partial section 43, and a reaction product is released. The reaction product reacts with the reactant 48 in the reaction chamber 46 in an optically detectable manner in the third partial section 43.

In the presence of a component to be measured in the gas mixture, the digital camera 38 detects an optically detectable reaction in the reaction chamber 46. By means of the course over time or the degree of discoloration in the optically detectable reaction, a concentration of the component to be determined in the gas mixture is determined by the central control unit 41. If the component to be determined in the gas mixture is not contained in the gas mixture and is present in a concentration below a detection threshold of the concentration range of the present reaction carrier 14, then no optically detectable reaction is found in the reaction chamber 46. A corresponding result of the measurement is displayed optically or acoustically by the measuring device 12.

It is also possible that a plurality of the gas treatment elements 47 are formed by various reactants 48, each of which reacts in an optically detectable manner with various components or with reaction products of components of a gas mixture. It is also possible that gas treatment elements 47 exhibit an optically detectable change as a function of the chemical or physical properties of the gas mixture, for example, as a function of the temperature of the gas mixture or of the moisture. The recording field of the digital camera 38 is designed such that a plurality of different gas treatment elements 47 can be looked at and analyzed at the same time, especially in different partial sections 43 of the flow channel 42. Thus, a plurality of components can be measured at the same time, or the measurement of the concentration of a component can be improved by determining additional parameters, such as temperature and moisture.

A checking of leakage flows preferably takes place during each establishing of a connection between the gas ports 22, 24, which is described below on the basis of FIG. 13.

In a first step, the gas port 24 of the gas outlet channel 18 is connected to the corresponding connection element 44 of the reaction carrier 14. In a second step, gas is delivered through the gas outlet channel 18 and the flow channel 42 of the reaction carrier 14 connected thereto, wherein the gas flow through the gas outlet channel is measured for the checking of leakage flows. If the system of gas outlet channel and flow channel is gas-tight, then essentially no gas flow through the gas outlet channel 18 is measured, since the flow channel 42 of the reaction carrier 14 is closed in a gas-tight manner via the second connection element 44 closed by the sealing device 62.

In a further step, the gas inlet channel 16 is closed upstream by the valve 54 and the gas port 22 of the gas inlet channel 16 is connected to the corresponding connection element 44 of the reaction carrier 14. Subsequently, gas is delivered by the gas delivery device 28 through the gas outlet channel 18, the flow channel 42 and the gas inlet channel 16, wherein the gas flow through the gas outlet channel is measured for the checking of leakage flows. If the system of gas outlet channel 18, flow channel 42 and gas inlet channel 16 is gas-tight, then essentially no gas flow through the gas outlet channel 18 is measured, since the gas inlet channel 16 is closed in a gas-tight manner by the valve 54.

The measurement of an essentially zero gas flow during the measurement described in the preceding paragraphs in a gas-tight measuring system 10, in which normal pressure is present in the gas outlet channel 18, the flow channel 42 and/or the gas inlet channel 16 before the checking for leakage flows, should be interpreted such that an essentially exponentially decreasing gas flow following the vacuum is measured. In other words, the measured gas flow in a gas-tight measuring system 10 corresponds to the quantity of gas that is present in the channels 16, 18, 42 at the start of the measurement and that is pumped off through the gas delivery device 28 at the time of the checking for leakage flows.

If a leakage flow, i.e., a gas flow exceeding the gas flow mentioned in the preceding paragraph, is measured through the gas outlet channel 18, a corresponding error message is sent by the measuring device 12. The flow channel 42 on the reaction carrier 14 or gas outlet channel 18 and gas inlet channel 16 of the measuring device 12 can then be checked, for example, by the user.

It is also possible that already in a first step both gas ports 22, 24 of the gas outlet channel 18 and of the gas inlet channel 16 are connected to the corresponding connection elements 44 of the flow channel 42 and only one checking for leakage flows is carried out correspondingly.

While specific embodiments of the invention have been shown and described in detail to illustrate the application of the principles of the invention, it will be understood that the invention may be embodied otherwise without departing from such principles.

The invention claimed is:

1. A reaction carrier for a measuring device for the measurement of a concentration of gaseous and/or aerosol components of a gas mixture by means of a reactant, which reacts, with at least one component to be measured in the gas mixture or with a reaction product of the component to be measured, in an optically detectable manner, the reaction carrier comprising:
   two connection elements;
   at least one flow channel, which is split into at least two partial sections and which extends between the two connection elements;
   at least one gas treatment element provided in each of the at least two partial sections, which changes the chemical or physical properties of the gas mixture flowing through or reacts as a function of the chemical or physical properties;
   a separating element separating the at least two partial sections of the at least one flow channel from one another in a gas-tight manner, wherein the separating element prevents fluid from flowing between the at least two partial sections; and
   at least one coupling element opening the separating element upon an activation of the at least one coupling element to establish a connection between the at least two partial sections, wherein the at least two partial sections are in fluid connection with each other after the at least one coupling element opens the separating element, the separating element comprising at least one closed partial section end of at least one of the at least two partial sections, the at least one coupling element being configured to open the separating element by irreversibly displacing the at least one closed partial section end from one position in which the at least one closed partial section end defines a barrier to a permanent second position in which the at least one closed partial section end never again forms the barrier.

2. A reaction carrier in accordance with claim 1, wherein the at least two partial sections comprise tubes and the at least one closed partial section end comprises at least one closed tube end.

3. A reaction carrier in accordance with claim 2, further comprising a housing, wherein:
   the at least one closed tube end is arranged in a cavity in the housing of the reaction carrier;
   the cavity is defined by one or more surfaces of the housing;
   the at least one closed tube end is located at a spaced location from each of the one or more surfaces of the housing; and
   the at least one coupling element has a sealing element, which closes the cavity in a gas-tight manner and which can be deformed upon activation of the at least one coupling element in order to break off the at least one closed tube end arranged in the cavity.

4. A reaction carrier in accordance with claim 1, wherein the reaction carrier has an axial direction, which corresponds to a movement direction of the reaction carrier in the measuring device, and wherein the two connection elements are arranged on the same position in the axial direction.

5. A reaction carrier in accordance with claim 1, wherein at least one partial section of the at least one flow channel crosses the other partial section of the same or of a different flow channel.

6. A reaction carrier in accordance with claim 1, wherein the at least one gas treatment element comprises at least two of the following:
   desiccants, reactants for producing a chemical intermediate product, chemical or physical filters, temperature- and/or moisture-sensitive substances, reactants for optically detectable reactions.

7. A reaction carrier in accordance with claim 1, wherein a digital camera is configured to detect at least one optically detectable reaction in the at least two partial sections.

8. A measuring device for measuring a concentration of gaseous and/or aerosol components of a gas mixture for a reaction carrier comprising connection elements, at least one flow channel, split into at least two partial sections, which extends between the connection elements, at least one gas treatment element provided in each of the at least two partial sections, which changes the chemical or physical properties of the gas mixture flowing through or reacts as a function of the chemical or physical properties, a separating element separating the at least two partial sections of the at least one flow channel from one another in a gas-tight manner and at least one coupling element designed to open the separating element upon an activation of the at least one coupling element to establish a connection between the at least two partial sections, the separating element comprising at least one closed end of at least one of the two partial sections, the measuring device comprising:
   a gas inlet channel and a gas outlet channel with each a gas port for the gas- and/or aerosol-carrying connection with the connection elements of the at least one flow channel of the reaction carrier; and
   at least one activation element, which is configured to activate the at least one coupling element of the reaction carrier to irreversibly open the separating element by breaking off the at least one closed end of at least one of the at least two partial sections such that each of the at least two partial sections is in fluid connection with each other.

9. A measuring device in accordance with claim 8, further comprising an optical sensor configured to detect at least two different optically detectable reactions in at least two different partial sections at the same time, the optical sensor comprising a digital camera.

10. A measuring device in accordance with claim 8, wherein the at least one activation element has a bridging channel, which establishes a gas- and/or aerosol-carrying connection of the at least two partial sections of the at least one flow channel of the reaction carrier upon activation of the at least one coupling element.

11. A measuring method for measuring a concentration of gaseous and/or aerosol components of a gas mixture, the measuring method comprising:
providing a reaction carrier, which has a flow channel extending between two connection elements, wherein the flow channel is split into at least two partial sections, which are separated from one another in a gas-tight manner by a separating element and in each of which a gas treatment element is provided, which changes the chemical or physical properties of the gas mixture flowing through or reacts as a function of the chemical or physical properties, the separating element blocking fluid communication between the at least two partial sections, the separating element comprising at least one closed end of at least one of the at least two partial sections;
providing a measuring device, which comprises a gas delivery device and gas ports;
establishing a gas- and/or aerosol-carrying connection between the at least two partial sections of the flow channel by breaking the at least one closed end of the at least one of the at least two partial sections to irreversibly open the separating element, wherein the at least two partial sections are in fluid communication with each other after opening the separating element;
establishing a gas- and/or aerosol-carrying connection of the gas ports of the measuring device with the connection elements of the flow channel of the reaction carrier;
delivering gas mixture to be measured through the flow channel of the reaction carrier, and
determining a concentration of the at least one component by means of an optically detectable reaction in at least one of the at least two partial sections of the flow channel.

12. A gas-measuring system for measuring the concentration of gaseous or aerosol components of a gas mixture, the system comprising:
a reaction carrier comprising a flow channel extending between two connection elements, wherein the flow channel is split into at least two partial sections, which are separated from one another in a gas-tight manner by a separating element and in each of which a gas treatment element is provided, which changes the chemical or physical properties of the gas mixture flowing through or reacts as a function of the chemical or physical properties, wherein fluid communication between the at least two partial sections is prevented via the separating element; and
a measuring device comprising a gas delivery device, a gas inlet channel and a gas outlet channel each with a gas port for fluid connection with the connection elements of the flow channel of the reaction carrier and at least one activation element to activate at least one coupling element of the reaction carrier such that the at least one coupling element opens the separating element, wherein the at least two partial sections are in fluid communication with each other after the separating element is opened via the at least one coupling element, the separating element comprising at least one closed end of the at least two partial sections, the at least one coupling element being configured to irreversibly open the separating element by contacting at least a portion of the at least one closed end and breaking off the at least one closed end from one of the at least two partial sections.

13. A gas-measuring system in accordance with claim 12, further comprising a control unit controlling the gas-measuring system by:
establishing a gas- and/or aerosol-carrying connection between the at least two partial sections of the flow channel by opening the separating element;
establishing a gas- and/or aerosol-carrying connection of the gas ports of the measuring device with the connection elements of the flow channel of the reaction carrier;
delivering gas mixture to be measured through the flow channel of the reaction carrier, and
determining a concentration of the at least one component by means of an optically detectable reaction in at least one of the at least two partial sections of the flow channel.

14. A gas-measuring system in accordance with claim 13, wherein the at least two partial sections comprise tubes and the at least one closed end comprises at least one closed tube end.

15. A gas-measuring system in accordance with claim 14, further comprising a housing, wherein:
the at least one closed tube end is arranged in a cavity in the housing of the reaction carrier;
the cavity is defined by one or more surfaces of the housing;
the at least one closed tube end is located at a spaced location from each of the one or more surfaces of the housing; and
the at least one coupling element has a sealing element, which closes the cavity in a gas-tight manner and which can be deformed upon activation of the at least one coupling element in order to break off the at least one closed tube end arranged in the cavity.

16. A gas-measuring system in accordance with claim 13, wherein the reaction carrier has an axial direction, which corresponds to a movement direction of the reaction carrier in the measuring device, and wherein the two connection elements are arranged on the same position in the axial direction.

17. A gas-measuring system in accordance with claim 13, wherein at least one partial section of the flow channel crosses the other partial section of the same or of a different flow channel.

18. A gas-measuring system in accordance with claim 13, wherein the gas treatment element comprises at least two of the following:
desiccants, reactants for producing a chemical intermediate product, chemical or physical filters, temperature- and/or moisture-sensitive substances, reactants for optically detectable reactions.

19. A gas-measuring system in accordance with claim 13, further comprising an optical sensor configured to detect at least two different optically detectable reactions in at least two different partial sections at the same time, the optical sensor comprising a digital camera.

20. A gas-measuring system in accordance with claim 13, wherein the at least one activation element has a bridging channel, which establishes a gas-and/or aerosol-carrying connection of the at least two partial sections of the flow channel of the reaction carrier upon activation of the at least one coupling element.

* * * * *